(No Model.)
E. V. STRAIGHT.
VEHICLE AXLE AND BEARING.
No. 371,991. Patented Oct. 25, 1887.
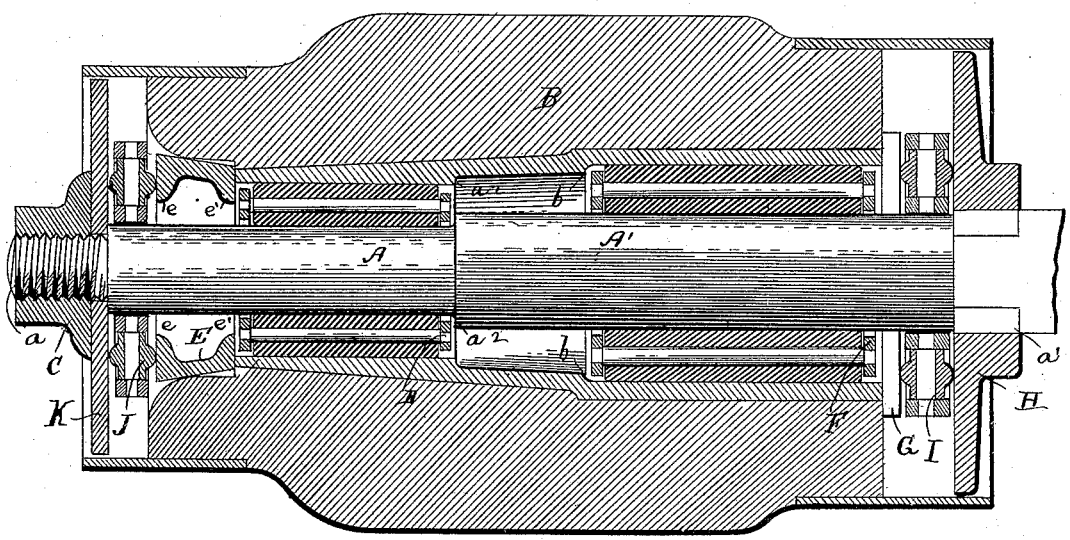
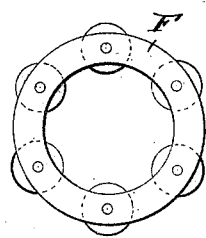
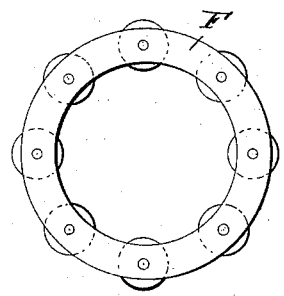
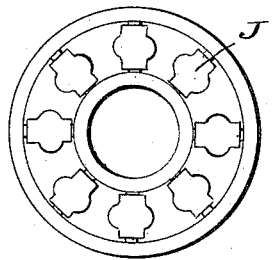
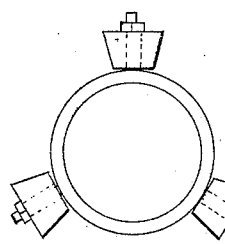
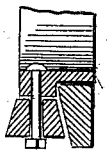
Witnesses
R. C. Laurig
G. P. Kramer
Inventor
Ernest V. Straight
By his Attorneys
R. S. & A. Lacey

UNITED STATES PATENT OFFICE.

ERNEST VICTOR STRAIGHT, OF RICHLAND CENTRE, WISCONSIN.

VEHICLE-AXLE AND BEARING.

SPECIFICATION forming part of Letters Patent No. 371,991, dated October 25, 1887.

Application filed July 18, 1887. Serial No. 244,626. (No model.)

*To all whom it may concern:*

Be it known that I, ERNEST VICTOR STRAIGHT, a citizen of the United States, residing at Richland Centre, in the county of Richland and State of Wisconsin, have invented certain new and useful Improvements in Axles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to devices for reducing the friction between the spindle and the hub of a vehicle, and has for its object to improve the device patented August 30, 1870, No. 106,969, whereby the same is simplified and rendered more useful, efficient, and durable. In said patent the anti-friction rollers are carried by rings, which are firmly secured to the axle or spindle, which cause an unequal wear of the rollers, inasmuch as the lowest rollers support the load and are subjected to the greatest wear. This unequal wear produces lost motion and causes an unsteady or wabbling motion of the wheel. The strain on the rollers at each end of the hub is borne by the journals, which soon wear through and oftentimes break under lateral thrust of the wheel. The anti-friction bearings between the axle or spindle and hub would after a short time become sufficiently loose to move longitudinally on the axle or spindle and wedge in between the hub and spindle.

The present invention aims to obviate all of the objections against said former device by having the anti-friction devices mounted so as to revolve on the spindle independently of the hub or wheel and have them confined between shoulders on the spindle and in the hub, whereby they are held against any longitudinal movement on the spindle independently of the hub. The anti-friction rollers at the ends of the hub extend on each side of their supports, so as to receive the pressure on diametrically-opposite sides, thereby removing the strain from their journals.

The improvement consists in the novel and peculiar construction and combination of parts, which will be more fully hereinafter set forth and claimed, and shown in the annexed drawings, in which—

Figure 1 is a longitudinal sectional view, parts being broken away, of a wheel and the anti-friction devices, showing the spindle in side elevation. Figs. 2 and 3 are end views of the anti-friction devices designed to be interposed between the spindle and hub; Fig. 4, an end view of the anti-friction device for the end of the hub, and Fig. 5 end and detail sectional views of a modified form of hub-end anti-friction device. Fig. 6 is a detail view of a further modification.

The spindle, composed of the two parts A and A', has a shoulder, $a'$, at its inner end and a threaded extension, $a$, at its outer end, on which the axle-nut C is secured for holding the wheel or hub B in place on the spindle. The part A is of smaller diameter than the part A', forming the shoulder $a^2$ between them, which limits the inward movement of the anti-friction bearing D, its outward movement being limited by the bushing E. Each of the parts A and A' is of uniform diameter throughout its entire length, and is provided with an anti-friction bearing, D and F, respectively. The inner end of the hub is enlarged, forming the shoulder $b$, between which and the washer G the anti-friction bearing F is confined and held against longitudinal displacement. The anti-friction bearings D and F are of different sizes. Otherwise they are constructed exactly alike, and are composed of two rings having rollers journaled between them on shafts, which have reduced ends fitted into said rings to prevent them crowding the rollers and interfering with their free movement. The rings are of a less width than the rollers, and the rollers are so journaled that their inner and outer sides extend beyond the inner and outer edges of the rings, respectively. The washer G overlaps the inner end of the hub, and between washer G and washer H, resting against shoulder $a'$, is located the hub-end anti-friction device I, composed of an inner and outer ring, radial shafts uniting the rings, and the anti-friction rollers mounted on the shafts and projecting beyond the edges of the rings to obtain a bearing on washers G and H.

The bushing E has inwardly-projecting flanges $e$ and $e'$. The flange $e'$ overlaps and bears against a portion of the end of the hub and prevents the outward displacement of the anti-friction bearing D. The flange $e$ forms a bearing for the rollers of the hub-end anti-friction device J, constructed exactly like the hub-end anti-friction device I, and confined between said bushing and the washer K. The rollers of the hub-end anti-friction devices are swelled or enlarged between their ends to present as little contacting surface as possible. The outer rings may be dispensed with, and the radial shafts or spindles for the rollers be supported at their inner ends and have nuts $l$ on their outer ends for confining and holding the rollers in place. In some instances it is found expedient to have the hub-end rollers tapering or of truncated-cone shape, in which case the contiguous sides of the washers, &c., between which they are located will be correspondingly inclined.

The anti-friction bearings and hub-end devices are loosely mounted on the spindle, and are free to revolve thereon independently of the hub, thereby evenly distributing the wear, so that all the parts, especially the rollers, will wear alike.

The inner ring may be extended at one end and the washer may be mounted on said extension, as most clearly shown by Fig. 6. By such construction the axle is not cut through so soon, as a broad bearing is obtained for the hub-end anti-friction devices. The extension is about equal to but not greater than the thickness of the washer at its inner edge.

Having thus described my invention, what I claim, and desire to secure by Letters Patent, is—

1. The combination of the spindle composed of two parts of different diameter, having a shoulder between the parts, the hub having its bore enlarged at its inner end, forming a shoulder, the two anti-friction devices mounted on the spindle, the washer and bushing at each end of the hub, confining the anti-friction bearings between them and the shoulder in the hub and the shoulder on the spindle, respectively, the hub-end anti-friction devices, and the end washers, substantially as specified, for the purpose set forth.

2. The combination, with the spindle, the hub, and the end washer having its inner side beveled, of the ring having radial shafts or studs, and the truncated-cone shaped anti-friction rollers placed on said shafts, substantially as and for the purpose described.

In testimony whereof I affix my signature in presence of two witnesses.

ERNEST VICTOR STRAIGHT.

Witnesses:
F. W. BURNHAM,
W. F. HOLLISTER.